(12) United States Patent
Hughes

(10) Patent No.: US 6,718,444 B1
(45) Date of Patent: Apr. 6, 2004

(54) READ-MODIFY-WRITE FOR PARTIAL WRITES IN A MEMORY CONTROLLER

(75) Inventor: William Alexander Hughes, Burlingame, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 91 days.

(21) Appl. No.: 10/028,840

(22) Filed: Dec. 20, 2001

(51) Int. Cl.[7] .............................................. G06F 12/00
(52) U.S. Cl. ...................... 711/155; 711/154; 710/39; 710/52; 710/65; 710/66; 714/6; 714/764
(58) Field of Search ............................. 711/155, 154, 711/167, 143; 714/6, 764; 710/52, 65, 66, 39

(56) References Cited

U.S. PATENT DOCUMENTS

| | | | |
|---|---|---|---|
| 4,785,394 A | 11/1988 | Fischer | 710/114 |
| 5,008,886 A | 4/1991 | Chinnaswamy et al. | 714/764 |
| 5,629,894 A | 5/1997 | Cho et al. | 365/189.01 |
| 5,666,515 A * | 9/1997 | White et al. | 711/152 |
| 5,912,906 A | 6/1999 | Wu et al. | 714/763 |
| 5,917,839 A | 6/1999 | Hashimoto et al. | 714/805 |
| 5,978,952 A | 11/1999 | Hayek et al. | 714/764 |
| 6,073,219 A | 6/2000 | Ohno | 711/155 |
| 6,101,614 A * | 8/2000 | Gonzales et al. | 714/6 |

* cited by examiner

Primary Examiner—Mano Padmanabhan
Assistant Examiner—Jasmine Song
(74) Attorney, Agent, or Firm—Lawrence J. Merkel; Meyertons, Hood, Kivlin, Kowert & Goetzel, P.C.

(57) ABSTRACT

An apparatus is contemplated, including a router and a memory controller. The router is configured to route a write request and write data to the memory controller. The memory controller is coupled to receive the write request and the write data. If the write data is a number of bytes less than a minimum number of bytes writeable to a memory to which the memory controller is capable of being coupled, the memory controller is configured to read first data from the memory. The first data comprises the minimum number of bytes and includes bytes to be updated with the write data. The memory controller is configured to return the first data to the router as a read response. The router is configured to return the first data to the memory controller.

21 Claims, 8 Drawing Sheets

Fig. 1

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | SrcTag[4:0] | | | | |
| 4 | | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

32

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | SrcTag[4:0] | | | | |
| 4 | | Prb | | | | | | |

| V | Address | SrcNode | SrcUnit | SrcTag | Type | WDB Ptr | PI | RR | RC | PD | TD |

READ-MODIFY-WRITE FOR PARTIAL WRITES IN A MEMORY CONTROLLER

BACKGROUND OF THE INVENTION

1. Field of the Invention

This invention is related to the field of computer systems and, more particularly, to memory controllers in computer systems.

2. Description of the Related Art

Memory controllers are included in computer systems to manage access to memory. Typically, the memory includes some form of dynamic random access memory (DRAM). Varieties of DRAM include asynchronous DRAM, synchronous DRAM (SDRAM), double data rate SDRAM (DDR SDRAM), Rambus DRAM (RDRAM), etc. Some computer systems may include a single memory comprising one or more DRAMs and a single memory controller to control access to the memory. Other systems, referred to as distributed memory computer systems, may include multiple memories (each comprising one or more DRAMs) separately accessible using respective memory controllers.

Typically, a given memory may require a minimum number of bytes to be written when a write is performed to the memory, which will be referred to as the "write width". The write width may, for example, be the width of one data transfer to/from the memory. Alternatively, the write width may be a portion of the data transfer or multiple data transfers.

If a write request is received by the memory controller, and the write request updates a number of bytes less than the write width, the memory controller may perform a read-modify-write operation to complete the write request. The memory controller typically includes a data buffer into which the write data is stored (using a first port on the data buffer). The memory controller then reads at least a write-width of data from the memory, and provides that data directly to the data buffer using a second port on the buffer. The read data is merged with the write data in the buffer (thus modifying the read data with the write data), and written back to memory. The read-modify-write is entirely local to the memory controller.

SUMMARY OF THE INVENTION

An apparatus is contemplated, including a router and a memory controller. The router is configured to route a write request and write data to the memory controller. The memory controller is coupled to receive the write request and the write data. If the write data is a number of bytes less than a minimum number of bytes writeable to a memory to which the memory controller is capable of being coupled, the memory controller is configured to read first data from the memory. The first data comprises the minimum number of bytes and includes bytes to be updated with the write data. The memory controller is configured to return the first data to the router as a read response. The router is configured to return the first data to the memory controller.

A memory controller is contemplated, comprising a request queue coupled to receive a write request, a data buffer coupled to receive write data corresponding to the write request, and a control circuit coupled to the request queue and the data buffer. The control circuit is configured, if the write data is a number of bytes less than a minimum number of bytes writeable to a memory to which the memory controller is capable of being coupled, to read first data from the memory. The first data comprises the minimum number of bytes and includes bytes to be updated with the write data. The control circuit is further configured to transmit the first data as a read response. The data buffer is coupled to receive the first data returned to the memory controller as a read response, and the control circuit is configured to merge the first data and the write data.

A method is also contemplated. A write request and write data are received in a memory controller. If the write data is a number of bytes less than a minimum number of bytes writeable to a memory to which the memory controller is capable of being coupled, first data is read from the memory. The first data comprises the minimum number of bytes and includes bytes to be updated with the write data. The first data is transmitted from the memory controller as a read response, and is received in the memory controller.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

System Overview

Figure 1:
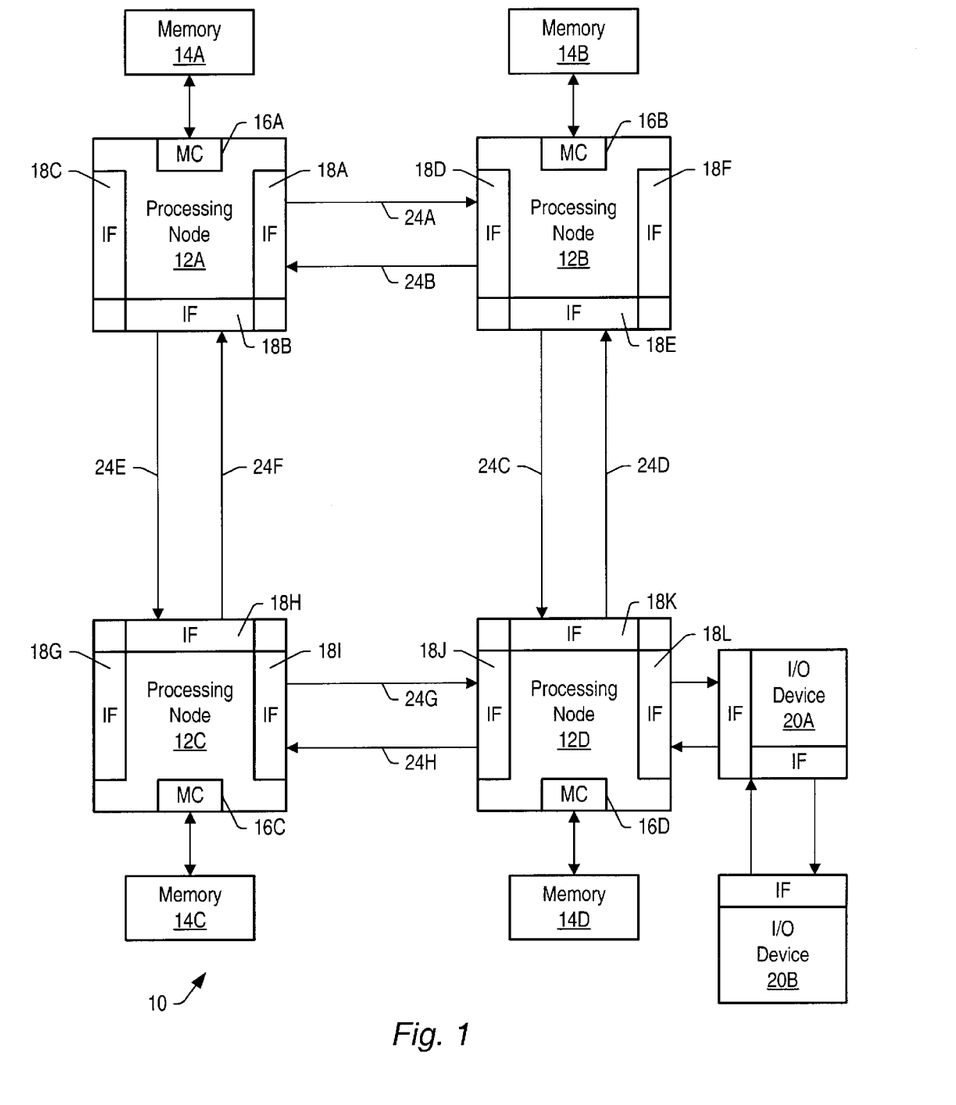
FIG. 1 is a block diagram of one embodiment of a computer system.

Turning now to FIG. 1, one embodiment of a computer system 10 is shown. Other embodiments are possible and contemplated. In the embodiment of FIG. 1, computer system 10 includes several processing nodes 12A, 12B, 12C, and 12D. Each processing node is coupled to a respective memory 14A–14D via a memory controller 16A–16D included within each respective processing node 12A–12D. Additionally, processing nodes 12A–12D include interface logic used to communicate between the processing nodes 12A–12D. For example, processing node 12A includes interface logic 18A for communicating with processing node 12B, interface logic 18B for communicating with processing node 12C, and a third interface logic 18C for communicating with yet another processing node (not shown). Similarly, processing node 12B includes interface logic 18D, 18E, and 18F; processing node 12C includes interface logic 18G, 18H, and 18I; and processing node 12D includes interface logic 18J, 18K, and 18L. Processing node 12D is coupled to communicate with an input/output (I/O) device 20A via interface logic 18L, and I/O device 20A is further coupled to a second I/O device 20B. Other processing nodes may communicate with other I/O devices in a similar fashion. Alternatively, a processing node may communicate with an I/O bridge which is coupled to an I/O bus.

Processing nodes 12A–12D implement a packet-based link for inter-processing node communication. In the present embodiment, the link is implemented as sets of unidirectional lines (e.g. lines 24A are used to transmit packets from processing node 12A to processing node 12B and lines 24B are used to transmit packets from processing node 12B to processing node 12A). Other sets of lines 24C–24H are used to transmit packets between other processing nodes as illustrated in FIG. 1. The link may be operated in a cache coherent fashion for communication between processing nodes or in a noncoherent fashion as a daisy-chain structure between I/O devices 20A–20B (and additional I/O devices, as desired). It is noted that a packet to be transmitted from one processing node to another may pass through one or more intermediate nodes. For example, a packet transmitted by processing node 12A to processing node 12D may pass through either processing node 12B or processing node 12C as shown in FIG. 1. Any suitable routing algorithm may be used. Other embodiments of computer system 10 may include more or fewer processing nodes then the embodiment shown in FIG. 1.

In one embodiment, the links are source-synchronous interfaces in which each set of unidirectional lines has an associated clock or clocks transmitted by the source. The data on the lines is synchronized to the clock, and is sampled by the receiver using the transmitted clock.

Processing nodes 12A–12D, in addition to a memory controller and interface logic, may include one or more processors. Broadly speaking, a processing node comprises at least one processor and may optionally include a memory controller for communicating with a memory and other logic as desired. As used herein, a "node" is a device which is capable of participating in transactions upon the interconnect.

Memories 14A–14D may comprise any suitable memory devices. For example, a memory 14A–14D may comprise one or more RDRAMs, SDRAMs, DDR SDRAMs, DRAM, static RAM, etc. The address space of computer system 10 is divided among memories 14A–14D. Each processing node 12A–12D may include a memory map used to determine which addresses are mapped to which memories 14A–14D, and hence to which processing node 12A–12D a memory request for a particular address should be routed. In one embodiment, the coherency point for an address within computer system 10 is the memory controller 16A–16D coupled to the memory storing bytes corresponding to the address. Memory controllers 16A–16D may comprise control circuitry for interfacing to memories 14A–14D. Additionally, memory controllers 16A–16D may include request queues for queuing memory requests.

Generally, interface logic 18A–18L may comprise circuitry for communicating on the links to which they are connected. The interface logic 18A–18L may include a FIFO buffer for receiving packets from the link and synchronizing the received data to the local clock domain in the node. Computer system 10 may employ any suitable flow control mechanism for transmitting packets. For example, in one embodiment, each node stores a count of the number of each type of buffer within the receiver at the other end of the link to which each interface logic is connected. The node does not transmit a packet unless the receiving node has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 20A–20B are illustrative of any desired peripheral devices. For example, I/O devices 20A–20B may comprise network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

In one embodiment, a read transaction to a memory location may begin with a read command packet transmitted by the source node of the transaction to a target node which owns the memory corresponding to the block. The target node transmits probe command packets (indicating return of probe responses to the source of the transaction) to the other nodes in the system to maintain coherency by changing the state of the block in those nodes and by causing a node including an updated copy of the block to send the block to the source node. Each node receiving a probe command packet transmits a probe response packet to the source node. If a probed node has an updated copy of the read data (i.e. dirty data), that node transmits a read response packet and the dirty data. A node transmitting dirty data may also, in some embodiments, transmit a memory cancel response packet to the target node in an attempt to cancel transmission by the target node of the requested read data. Additionally, the target node transmits the requested read data using a read response packet followed by the data in a data packet. If the source node receives a read response packet from a probed node, that read data is used. Otherwise, the data from the target node is used. Once each of the probe responses and the read data is received in the source node, the source node transmits a source done response packet to the target node as a positive acknowledgment of the termination of the transaction.

In one embodiment, a write transaction is initiated using a sized write command packet or a victim block command packet, either packet followed by a corresponding data packet. The victim block command is used for transferring evicted cache blocks back to memory. The sized write command is used for non-cacheable writes or writes of data other than a block in size (e.g. writes which do not update the write width of the memory). To maintain coherency for sized write commands, the target node transmits probe command packets (indicating return of probe response to the target node of the transaction) to each of the other nodes in the system. In response to the probe command packets, each probed node transmits a probe response packet to the target node. If a probed node is storing dirty data, the probed node responds with a read response packet and the dirty data. In this manner, a block updated by the sized write command is returned to the memory controller for merging with the data provided by the sized write command. The target node, in response to receiving probe responses from each of the probed nodes, transmits a target done response packet to the source node to provide a positive acknowledgment of the termination of the transaction. The source node replies with a source done response packet.

Figure 2:
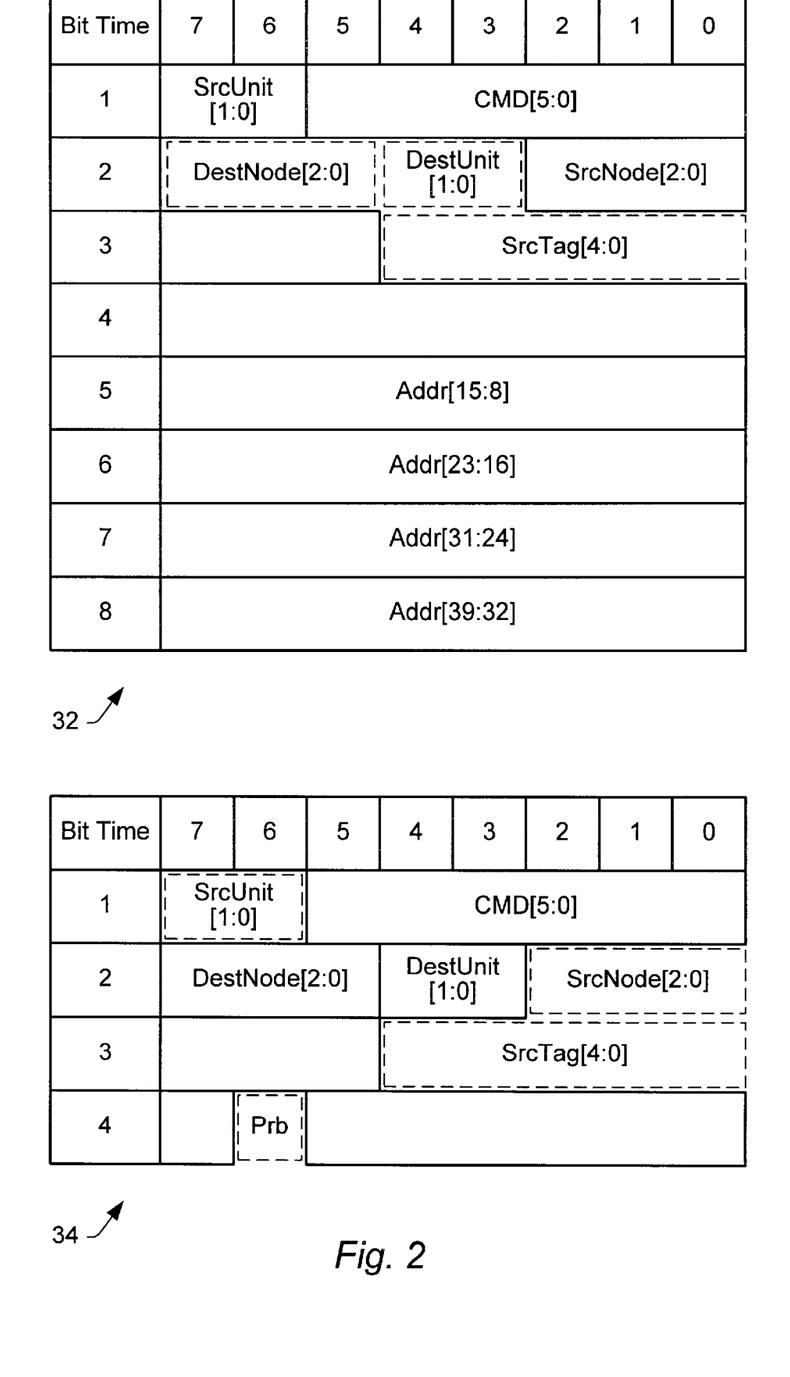
FIG. 2 is a block diagram of exemplary packets which may be used in one embodiment of the computer system shown in FIG. 1.

Turning now to FIG. 2, exemplary packets employed in one embodiment of system 10 are shown. Other embodiments may employ different packet definitions, as desired. Each of the packets are illustrated as a series of bit times enumerated under the "bit time" heading. The bit times of the packet are transmitted according to the bit time order listed. FIG. 2 illustrates packets for an eight bit link implementation. Other implementation may be wider or narrower. For example, 1, 2, 4, 16, or 32 bit links may be supported. In the embodiment of FIG. 2, each bit time comprises eight bits numbered seven through zero. Bits for which no value is provided in the figures may either be reserved for a given packet, or may be used to transmit packet-specific information. Fields indicated by dotted lines indicate optional fields which may not be included in all of the packets of a certain type.

Generally speaking, a packet is a communication between two nodes (an initiating node which transmits the packet and a destination node which receives the packet). The initiating node and the destination node may differ from the source and target node of the transaction of which the packet is a part, or either node may be either the source node or the target node. A control packet is a packet carrying control information regarding the transaction. Certain control packets specify that a data packet follows. The data packet carries data corresponding to the transaction and corresponding to the specifying control packet.

One embodiment of a command packet 32 is illustrated in FIG. 2. The command encoding is transmitted during bit time one, and comprises six bits in the present embodiment. A source unit (SrcUnit) number is transmitted during bit time 1 as well, and a source node (SrcNode) number is transmitted during bit time two. A node number unambiguously identifies one of the processing nodes 12A–12D within the computer system 10, and is used to route the packet through the computer system 10. The unit number identifies a unit within the node which sourced the transaction (source unit number) or which is the destination of the transaction (destination unit number). Units may include memory controllers, caches, processors, etc. Optionally, the command packet 32 may include either a destination node number (DestNode) and destination unit (DestUnit) in bit time 2. If the destination node number is included, it is used to route the packet to the destination node. Specifically, the write sized command packet includes the target node and target unit (the memory controller) in the destination node number and destination unit number fields. Also, many command packets may include a source tag in bit time 3 which, together with the source node and source unit, may link the packet to a particular transaction of which it is a part. For example, the write sized command packet includes the source tag. Bit times five through eight are used to transmit the most significant bits of the memory address affected by the transaction. Command packet 32 may be used to initiate a transaction (e.g. a read or write request), as well as to transmit commands in the process of carrying out the transaction for those commands which carry the memory address affected by the transaction (e.g. probe commands). Generally, a command packet indicates an operation to be performed by the destination node. In one specific implementation, the probe command packet may include the destination node and unit fields and the source tag field as well.

Some of the undefined fields in packet 32 may be used in various command packets to carry packet-specific information. Furthermore, bit time 4 may be used in some commands to transmit the least significant bits of the memory address affected by the transaction.

FIG. 2 also illustrates a response packet 34. The response packet 34 includes the command encoding and a destination node number and destination unit number. The destination node number identifies the destination node for the response packet (which may, in some cases, be the source node or target node of the transaction). The destination unit number identifies the destination unit within the destination node. Various types of response packets may include additional information. For example, a read response packet may indicate the amount of read data provided in a following data packet. Probe responses may indicate whether or not a copy of the requested block is being retained by the probed node. Generally, the response packet 34 is used for commands during the carrying out of a transaction which do not require transmission of the memory address affected by the transaction (e.g. probe response and read responses). Furthermore, the response packet 34 may be used to transmit positive acknowledgment packets to terminate a transaction. Similar to the command packet 32, the response packet 34 may include the source node number, the source unit number, and the source tag for many types of responses (illustrated as optional fields in FIG. 2). Finally, a probe bit (Prb) may be included in read response packets. The probe bit (Prb) may be set to indicate the read response is from a probed node and clear to indicate the read response is from the memory controller in the target node of the transaction. Other embodiments may reverse the meaning of the set and clear states or use other indications. In one specific implementation, the probe response packet and the read response packet may each include the source node, source unit, and source tag fields.

While the exemplary embodiment described herein uses packets to communicate in the distributed memory system, other embodiments may communicate using other communication mechanisms, as desired. Furthermore, a memory controller as described herein may be used in non-distributed memory systems.

Partial Write Operation

Figure 3:
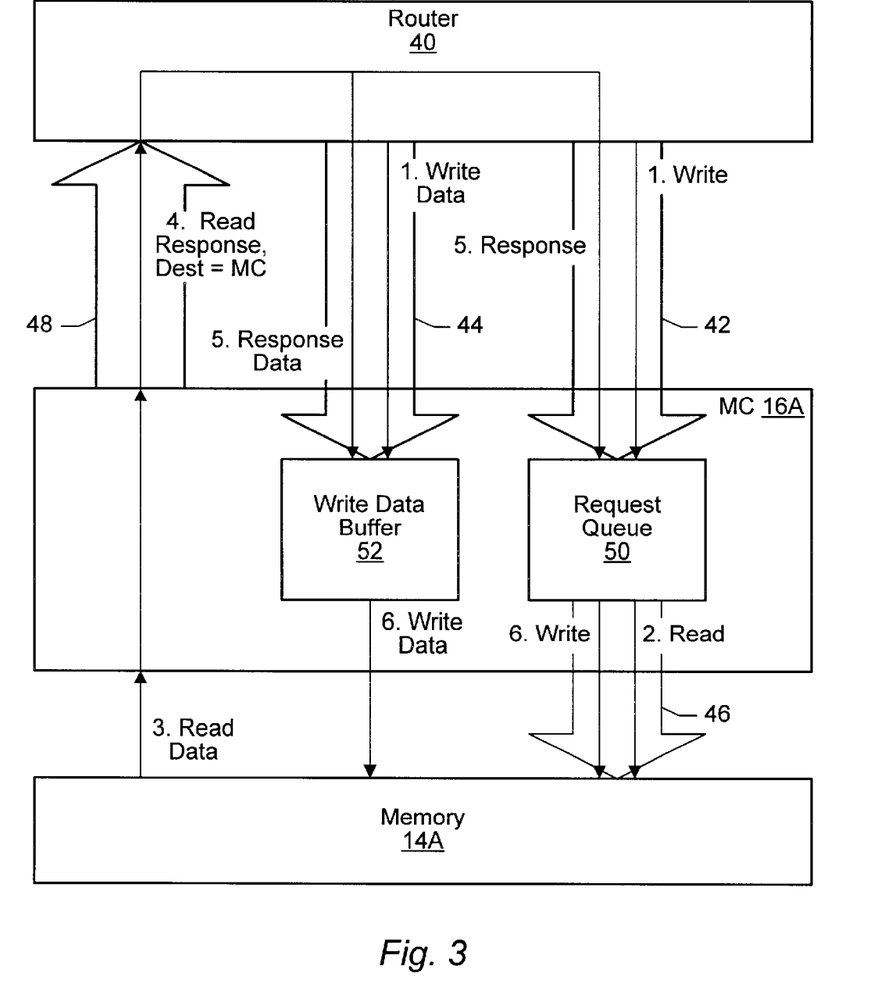
FIG. 3 is a simplified block diagram of one embodiment of a router and a memory controller, illustrating a read modify write for a partial write.

Turning next to FIG. 3, a high level block diagram of a portion of one embodiment of the node 12A and the corresponding memory 14A is illustrated. Other nodes may be configured similarly. Other embodiments are possible and contemplated. The block diagram of FIG. 3 highlights the flow of information for a write which updates a number of bytes less the write width of the memory 14A (referred to herein as a "partial write" for brevity). In the embodiment of FIG. 3, the node 12A includes a router 40 and the memory controller 16A. A request communication path 42 is illustrated for the router 40 routing requests (e.g. read or write requests) to the memory controller 16A, and a corresponding data path 44 is provided for transmitting data. A communication path 46 is shown between the memory controller 16A and the memory 14A. A response path 48 is also shown for the memory controller 16A communicating responses (with corresponding data) to the router 40.

The paths 42, 44, 46, and 48 are illustrated as wide arrows in FIG. 3 to allow for illustrating the flow of information on those paths during a partial write. The information flow is illustrated using the smaller arrows. Generally, the communication paths may be any communication medium between the corresponding elements.

A partial write begins with a write request and corresponding write data being transmitted by the router 40 to the memory controller 16A (numeral 1 in FIG. 3). The write request is transmitted via the request path 42, and the write data is transmitted via the data path 44. In the present embodiment, the memory controller 16A includes a request queue 50 and a write data buffer 52. The request queue 50 is coupled to the request path 42, and the write data buffer 52 is coupled to the data path 44. The memory controller 16A queues the write request in the request queue 50 and the write data in the write data buffer 52. It is noted that, while the write data and the write request arrive concurrently in the present embodiment, other embodiments may receive the write data subsequent to the write request.

Since the partial write does not update the entire write width of the memory 14A, the memory controller 16A performs a read of at least a write width of data including the data to be updated from the memory 14A using the path 46 (numeral 2 in FIG. 3). The write width may be the collective width of the DRAMs accessed in one read or write transfer to/from the memory (where multiple transfers in a burst may be used to read/write a cache block). Alternatively, the memory controller 16A may be optimized for cache block accesses and the write width may be a cache block (even if the cache block transfer uses more than one transfer to/from the memory 14A). The memory 14A returns the read data to the memory controller 16A (numeral 3 in FIG. 3).

The memory controller 16A returns the read data as a read response to the router 40 via the response path 48 (numeral 4 in FIG. 3). The read response includes a destination identifier (e.g. a destination node number and destination unit, for the embodiment of FIGS. 1 and 2) used by the router 40 to route the read response. For read responses due to read requests transmitted by the memory controller, the destination node/unit may be the source node/unit of the read transaction. For read responses due to a partial write, the memory controller 16A may set the destination node/unit to indicate the memory controller 16A itself. Thus, the router 40 routes the read response for the partial write back to the memory controller 16A using the request path 42 and the data path 44 (numeral 5 in FIG. 3). In other words, the read data for the read-modify-write in response to the partial write is communicated back to the memory controller 16A using the same communication path on which the write data is communicated, for the illustrated embodiment. The same port on the write data buffer 52 may be used for writing the write data into the write data buffer 52 and for writing the read data (merging the read data with the write data) to the write data buffer 52. The memory controller 16A may write the merged data to memory (numeral 6 in FIG. 3).

Generally, the router 40 is configured to route commands and responses among the memory controller 16A and other circuitry (e.g. CPUs, interfaces to other nodes, etc.). The commands may include requests; which are communications from a source to a target to read or write a location controlled by the target. The source generates the request. The target may be a memory controller coupled to a memory including a memory location targeted by the request, or an I/O device. The commands may also include probes to maintain coherency. The responses may include probe responses to indicate that the probe has been processed by a node and read responses which carry data corresponding to a read (e.g. from a memory such as the memory 14A). Generally, a response is a communication from a circuit which is generated due to the receipt of a command by that circuit. The response may carry data in response to the command, or may be an acknowledgment that the circuit has completed the command. In the embodiment of FIGS. 1 and 2, the commands and responses may be packets transmitted on the links between nodes. The requests and responses routed to the memory controller 16A in FIGS. 3 and 4 may be packets, or may include the packet data used by the memory controller 16A organized in any fashion. Other embodiments may include requests and responses transmitted in other fashions (e.g. buses).

The commands and responses may include a destination identifier used by the router 40 to route the command or response appropriately. Generally, the destination identifier may be any combination of one or more values that identify the destination within the computer system 10. For example, in the embodiment of FIGS. 1 and 2, the destination identifier may include the destination node number identifying a node (e.g. one of nodes 12A–12D) and a destination unit identifying a circuit within the node (e.g. a processor, the memory controller, a host bridge to an I/O device, etc.). Additionally, the commands and responses may include a source identifier identifying the source of a transaction of which the command/response is a part. For example, in the embodiment of FIGS. 1 and 2, the source identifier may include a source node and a source unit. Additionally, a source tag may be provided to identify the transaction among multiple transactions which may be outstanding from that source. For the remainder of this discussion, the destination node/unit and source node/unit/tag may be used. However, it is understood that any destination identifier and source identifier may be used.

Figure 4:
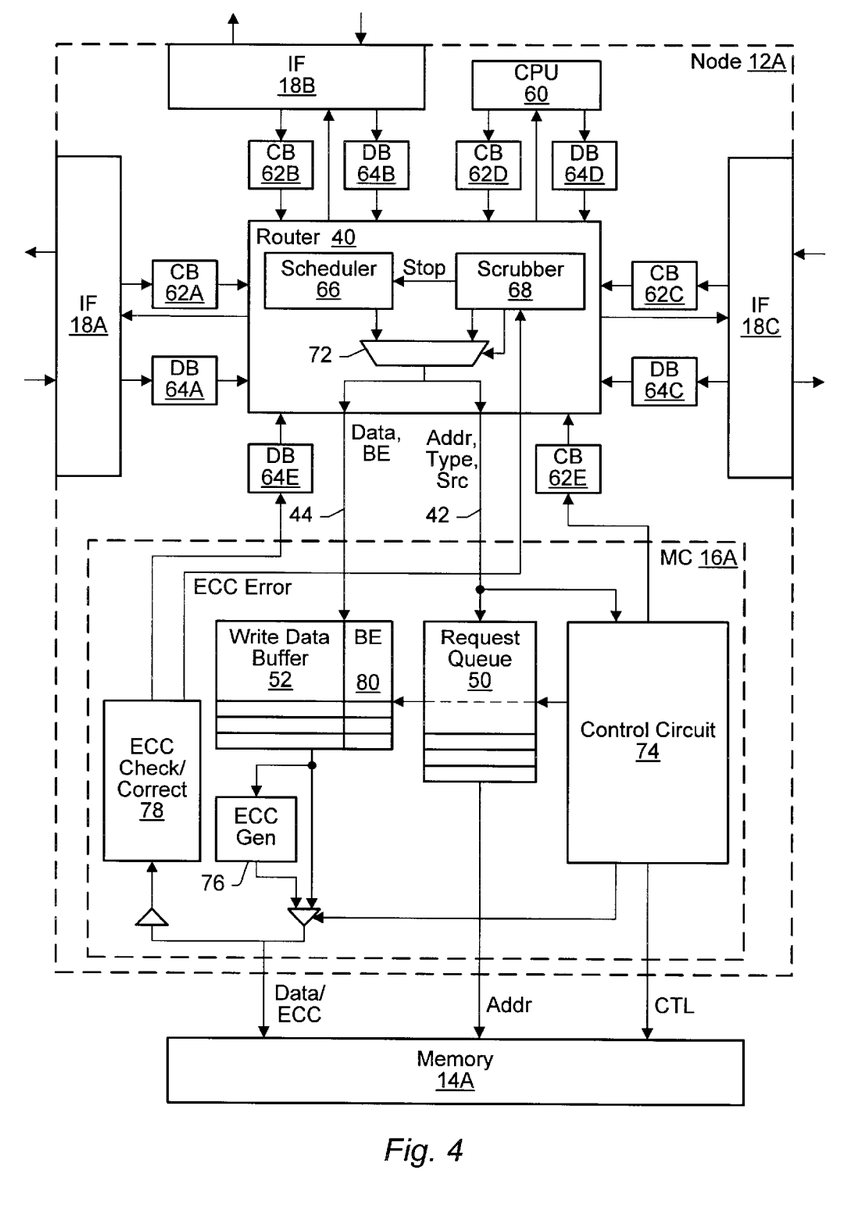
FIG. 4 is a more detailed block diagram of one embodiment of a router and a memory controller.

Turning now to FIG. 4, a more detailed block diagram of one embodiment of the node 12A is shown. Other nodes 12B–12D may be similar. Other embodiments are possible and contemplated. In the embodiment of FIG. 4, the node 12A includes the interfaces 18A–18C, the router 40, the memory controller 16A, and a CPU 60. Each of the interfaces 18A–18C, the memory controller 16A, and the CPU 60 is coupled to respective control buffers 62A–62E and data buffers 64A–64E as shown in FIG. 4. The router 40 is coupled to each of the control buffers 62A–62E and the data buffers 64A–64E. Additionally, the router 40 is coupled to each of the interfaces 18A–18C, the CPU 60, and the memory controller 16A. The interfaces 18A-18C are each coupled to respective links for other nodes. In the illustrated embodiment, the router 40 includes a scheduler 66, a scrubber 68, and a multiplexor (mux) 72. The scrubber 68 is coupled to the scheduler 66, and the mux 72. The scheduler is also coupled to the mux 72. The output of the mux 72 may form the request path 42 and the data path 44 to the memory controller 16A. The inputs from the memory controller 16A to the data buffer 64E and the control buffer 62E may collectively comprise the response path 48 from the memory controller 16A. In the illustrated embodiment, the memory controller includes a control circuit 74, the request queue 50, the write data buffer 52, a byte enable buffer 80, an error correction code (ECC) generator circuit 76, and an ECC check/correct circuit 78. The control circuit 74 is coupled to the control buffer 62E, the request path 42, the request queue 50, the write data buffer 52, the byte enable buffer 80, and the control interface to the memory 14A. The request queue 50 is coupled to the request path 42 and the address interface to the memory 14A. The write data buffer 52 is coupled to the data path 44, the ECC generator circuit 76, and the data interface to the memory 14A. The ECC generator circuit 76 is further coupled to the data interface to the memory 14A. The byte enable buffer 80 is coupled to the data path 44. The ECC check/correct circuit 78 is coupled to the data interface to the memory 14A, to the data buffer 64E, and to the scrubber 68.

The control packets are stored in the control buffers 62A–62E and the corresponding data packets, if any, are stored in the data buffers 64A–64E. Each control buffer 62A–62E may include storage for one or more control packets, and each data buffer 64A–64E may include storage for one or more data packets. The control packets and data packets stored by the interfaces 18A–18C in the corresponding buffers 62A–62C and 64A–64C are packets received on the corresponding link from another node. On the other hand, control packets and data packets stored by the CPU 60 in the control buffer 62D and the data buffer 64D are generated by the CPU 60 (e.g. in response to instruction execution or in response to probes received by the CPU). The control packets and data packets stored by the memory controller 16A in the control buffer 62E and the data buffer 64E are generated by the memory controller 16A in response to requests. The memory controller 16A may be configured to generate read responses for read requests and for partial write requests, and probes for coherency maintenance in response to read and partial write requests.

In one embodiment, the memory controller 16A is configured to receive write sized command packets, probe response packets, and read response packets and is configured to generate read response packets and probe command packets. In other embodiments, non-packet communication methods may be used for transmission and/or reception of information by the memory controller, independent of whether or not such communication is used in the rest of the computer system 10. Where the following description refers to write requests, probes, probe responses, read responses, etc. (or packets of those types), the communication may be in the form of packets or any other form of communication.

Generally, the router 40 routes control packets (commands and response) and corresponding data packets from the interfaces 18A–18C, the CPU 60, and the memory controller 16A based on the destination node/unit in the packet. The router 40 may receive information from the control buffers 62A–62E and data buffers 64A–64E, or directly from the corresponding circuitry which store the packets in the buffers, identifying the packets stored therein and the destination. The scheduler 66 schedules packets for transmission based on the destination's availability to accept the packet and transmits the packet to the destination. For example, a packet received from the links through the interface 18A and stored in the control buffer 62A may be destined for the CPU 60 or the memory controller 16A, or may be destined for another node. If the packet is destined for the CPU 60 and the CPU 60 is able to receive the packet (e.g. the CPU 60 has a buffer to store the packet for processing), the scheduler 66 may schedule the packet for transmission to the CPU 60. The router 40 then reads the packet from the control buffer 62A (and the corresponding data packet from the data buffer 64A, if applicable) and transmits the packet to the CPU 60. The router may similarly deliver the packet to the memory controller 16A if the packet is destined for the memory controller 16A. If the packet is destined for another node, the router 40 may route the packet to one of the interfaces 18B–18C depending on the destination node for the packet. Some packets may have more than one destination (e.g. probe packets may be broadcast to all nodes). In such cases, the router 40 may route the packet to more than one destination.

Figure 5:
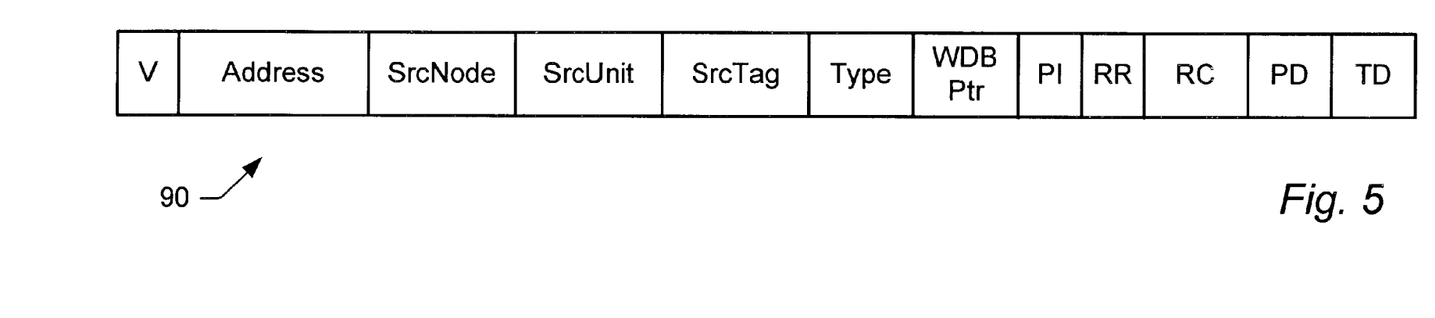
FIG. 5 is a block diagram illustrating one embodiment of a request queue entry for a request queue shown in the memory controller of FIG. 4.

The request routed to the memory controller 16A by the router 40 may be a partial write request. If so, the request is routed to the request queue 50 on the request path 42 and the data is routed to the write data buffer 52 on the data path 44. Additionally, a set of byte enables indicating which bytes are valid in the data (since the data is less than the write width of the memory) may be supplied on the data path and stored in the byte enable buffer 80. The control circuit 74, in response to the partial write request, allocates a request queue entry in the request queue 50 to store the request information (e.g. the address, the type, the source information such as the source node, unit, and tag, etc.), a data buffer entry to store the data, and a byte enable buffer entry to store the byte enables. The request queue entry may also store additional state which may be used to control the processing of the partial write request, and the control circuit 74 may initialize the state for the request. An example of such state is shown in FIG. 5 and described in more detail below.

The control circuit 74 scans the request queue 50 to select a request for servicing in the memory 14A. If the partial write request is selected, the control circuit 74 performs a read on the control portion of the memory interface. The request queue 50 transmits the address on the address interface to the memory 14A. The memory returns the data on the data portion of the memory interface (which is bidirectional to allow for both reads and writes).

In the present embodiment, the memory controller 16A employs ECC to detect errors in the data stored by the memory 14A. Such errors may be introduced due to noise effects on the memory 14A, random alpha particles impacting the memory, etc. By storing an ECC code, generated from the stored data using a predefined algorithm, errors may be detected and corrected. Various ECC algorithms exist, including the popular single error correction, double error detection (SEC-DED) scheme. In the SEC-DED scheme, a single bit error in the data is both detectable and correctable, and a double bit error (an error in two bits) is detectable but not correctable. Three or more bits in error may or may not be detected in the SEC-DED scheme. In one example, the width of data transfer from the memory 14A may be 64 bits and 8 bits of ECC may be used to implement the SEC-DED scheme for the 64 bits of data. Additional ECC bits may be implemented to detect larger numbers of errors in the data.

The ECC check/correct circuit 78 receives the data read from the memory 14A and the corresponding ECC data. The ECC check/correct circuit 78 checks the data for ECC errors using the ECC data and the predefined algorithm. If an ECC error is detected and is correctable (e.g. a single bit error in the SEC-DED scheme), the ECC check/correct circuit 78 corrects the error and stores the corrected data in the data buffer 64E. If an ECC error is detected and is not correctable, the uncorrected data may be stored in the data buffer 64E and the corresponding read response packet may indicate an error so that the source of the request may be informed that the data is in error.

The control circuit 74 generates a read response packet for the read data and stores the read response packet in the control buffer 62E. The control circuit 74 may include the source node/unit/tag (from the corresponding request queue entry) in the read response, and may also indicate that the read response is from the memory controller using the Prb indication in the read response packet, similar to read responses for read requests. However, instead of setting the destination node/unit to indicate the requester (as would be the case for a read response corresponding to a read request), the control circuit 74 sets the destination node/unit to indicate the memory controller 16A when the read response is part of the read-modify-write for the partial write request. The scheduler 66 detects that the destination is the memory controller 16A in the same manner as other packets, and thus routes the read response back to the memory controller 16A using the request path 42 and the data path 44.

The control circuit 74, in response to receiving the read response on the paths 42 and 44, merges the read data into the write data buffer 52 under control of the byte enables in the byte enable buffer 80. For example, the byte enables may include one bit per byte. The bit may be set to indicate that the corresponding byte is valid write data (i.e. the byte is being updated by the write request). The bit may be clear to indicate that the corresponding byte is not valid write data (i.e. the byte is not being updated by the write request). Particularly, read response data bytes for which the corresponding byte enable is clear are stored into the data buffer 52 and read response data bytes for which the corresponding byte enable is set are not stored into the data buffer 52, thus preserving the write data and filling in the read data for bytes which are not being written. Other embodiments may reverse the meaning of the set and clear states for the byte enables.

To select the write data buffer entry for merging, the control circuit 74 may compare the source node/unit/tag information (from the read response packet) to the corresponding information in the request queue 50, thus identifying the request for which the read response is provided. The request queue entry may include a pointer to the write data buffer entry allocated to the request, which may be provided to the write data buffer 52 and the byte enable buffer 80 for selecting the corresponding entries. In other embodiments, the write data buffer entries may have a predetermined correspondence to request queue entries.

With the write data thus merged with the read data from the read response, data of the write width of the memory 16A is available for storage in the memory 14A. The control circuit 74 may select the partial write request for processing again and may perform the write to the memory 14A. The write data may also be passed through the EC generator circuit 76 to generate ECC data for the write data. The write data and ECC data are transmitted on the data interface to the memory 14A.

As mentioned above, in the present embodiment, the data read for a partial write request receives ECC checking and correction via the ECC check/correct circuit 78. Accordingly, corrected data, with the write data merged in, is written to memory along with corresponding ECC data.

Errors in the data stored in memory 14A are random and occur due to some event. If the errors are not corrected periodically, the errors may accumulate. A correctable error may become an uncorrectable error. In an attempt to prevent such accumulation of errors, the node 12A may include the scrubber 68. Periodically, the scrubber 68 may interrupt the transmission of other accesses to make an access of its own (a "scrubber access"). The scrubber accesses are used to determine if an ECC error is detected and to correct the error. Generally, the scrubber sequentially accesses each memory location to check for ECC errors and to correct the error. Depending on how frequently each memory location is thus accessed, the frequency of error accumulation may be reduced.

The scrubber 68 may perform ECC scrubbing in the present embodiment by using partial write requests as its access. Particularly, the scrubber 68 may generate partial write requests with a byte count of zero (all byte enables clear). The memory controller 16A, in response to the partial write request, reads the memory location and returns a read response to the router, as described above. The read data passes through the ECC check/correct circuit 78 and any correctable ECC errors may be corrected. When the read response is provided to the write data buffer 52, since all the byte enables are clear, all of the read data is written into the write data buffer 52. Subsequently, the memory controller 16A stores the ECC-corrected data back to the memory, and thus the ECC error is automatically corrected without additional action by the scrubber 68.

In the illustrated embodiment, the scrubber 68 may signal the scheduler with a stop signal to indicate that a scrubber request is to be inserted. Additionally, the scrubber 68 may control the mux 72 to select the scrubber partial write request for transmission to the memory controller 16A. During other times, the scrubber 68 may allow packets scheduled by the scheduler 66 to pass through the mux 72. It is noted that, in other embodiments, the scrubber 68 may be implemented in the memory controller 16A.

The ECC check/correct circuit 78 may also detect ECC errors in read data corresponding to a read request, rather than a partial write request. While the data forwarded in the read response is corrected, the data stored in the memory may not be corrected. In one embodiment, the ECC check/correct circuit 78 may signal the scrubber 68 that an ECC error has occurred for a read request. The ECC check/correct circuit 78 may save its sequential scrubber address and may generate a scrubber request to the address of the read request. In this manner, a known ECC error in the memory 14A may be corrected via the scrubber 68. Subsequently, the scrubber 68 may restore its sequential scrubber address and continue generating sequential scrubber requests.

In one embodiment, memory coherency is enforced by the memory controller 16A. In such cases, data within the write width but not updated by the partial write request may have been modified by another node and may be cached in that other node. Additionally, a node may have a cached copy of the data which is no longer valid since the partial write request is updating the data. The control circuit 74 may generate a probe for the partial write request and may store the probe command packet in the control buffer 62E for routing by the router 40. Nodes may respond to the probe by invalidating cached copies of the block being updated and, if modified data is present in the node, returning the modified data to the memory controller 16A. In either case, a probe response packet is sent by each node. The probe may be generated prior to selecting the partial write request for processing in the memory 14A, concurrent with the selection, or subsequently, as desired. Probe response packets are routed from the probed nodes back to the memory controller 16A for partial write requests.

The probe responses are routed to the memory controller 16A similar to the read responses described above. Also similar to the read responses described above, the probe responses may include the source node/unit/tag for identifying which of the requests in the request queue the probe responses belong to. The memory controller 16A may count the probe responses to ensure that all responses have been received for a given partial write request before writing the data to memory. If a probe response includes data (e.g. the probe response packet is a read response packet with the Prb bit set), the data is merged into the write data buffer 52 in a manner similar to the read response from the memory controller 16A. Additionally, the control circuit 74 may note that a probe response has supplied data in the request queue entry, so that a subsequent read response from the memory controller 16A, if applicable, does not overwrite the response data from the probe response in the write data buffer 52.

In coherent embodiments, there may be multiple responses corresponding to a given partial write request. The responses, including the read response generated by the memory controller 16A to perform the read-modify-write, are routed through the router 40. In one embodiment, the router 40 may transmit at most one packet to the memory controller 16A per transfer (e.g. one per clock cycle). Thus, the various responses are naturally sequenced by the router 40, and thus the memory controller need not be capable of arbitrating between multiple sources of responses at once or be capable of handling multiple responses at once. Other embodiments may transmit more than one response concurrently, if desired.

In one embodiment, the completion of a partial write request is signaled to the source of the request using a target done response. In such embodiments, the control circuit 74 may generate a target done response packet and store the packet in the control buffer 62E for transmission. The target done response may be transmitted at least subsequent to the probe responses being received, but may be transmitted at any point thereafter.

The memory controller 16A may also handle read requests and block write requests. A read request is transmitted to the memory controller 16A on the request path 42. The memory controller 16A allocates a request queue entry in the request queue 50 for the read requests, and generates a probe to be broadcast to the other coherent nodes in the computer system 10. The probe command packet is stored in the control buffer 62E for routing by the router 40. The memory controller 16A selects the read request for processing, and reads the data corresponding to the read request from the memory 16A. The data passes through the ECC check/correct circuit 78 for ECC error checking and, if a correctable error is detected, the data is corrected. A read response packet is stored in the control buffer 62E for routing, and the data packet is stored in the data buffer 64E for routing with the read response packet. In some embodiments, the memory controller 16A may be configured to receive a memory cancel response from a probed node which cancels the read response. Block write requests may generally be handled by receiving the write request into the request queue 50 and the corresponding data into the write data buffer 52. No probes may be generated in this case. The block write request may be selected for processing, and the write may be performed to the memory 14A.

Generally, the request queue 50 may comprise one or more request queue entries. Each request queue entry is capable of storing a request, including its address, type, and other identifying information. In one embodiment, the request queue may be implemented as an address buffer that stores the address of the requests and a queue which stores the remaining information. The queue entries may include a pointer to the address buffer entry storing the address of the corresponding request. The queue may shift as requests are completed and deleted from the queue, while the address buffer entries may remain static while the request is in the queue. In other embodiments, the request queue 50 may not shift or may be a single shifting structure.

The write data buffer 52 may generally include one or more data buffer entries. Each data buffer entry may be configured to store a write width of data. Alternatively, each data buffer entry may be configured to store a block of data for block writes. The byte enable buffer 80 may include a corresponding number of byte enable entries, each configured to store the byte enables corresponding to the write data in a corresponding one of the data buffer entries. In one embodiment, the write data buffer 52 and the byte enable buffer 80 may be a single memory. Other embodiments may implement separate memories for the two buffers.

In one embodiment, the write data buffer 52 and byte enable buffer 80 may be allocated to a write request and may remain statically allocated during processing of the write request, even if the request queue 50 shifts as requests are deleted. The request queue 50 may include a write buffer pointer identifying the write buffer entry storing the data for a write request. In other embodiments, there may be a one-to-one correspondence between write buffer entries and request queue entries, and the write data buffer may be shifted concurrent with the request queue. In one embodiment, there may be fewer write data buffer entries than request queue entries since requests may be both reads (which may not use a write data buffer entry) or writes.

Generally, the memory interface between the memory controller 16A and the memory 14A (CTL, Addr, and Data/ECC) may be any type of interface dependent on the type of memory used. For example, the interface may be an industry standard asynchronous DRAM, SDRAM, DDR SDRAM, RDRAM or other type of DRAM interface.

It is noted that, while the present embodiment illustrates control buffers 62A–62E and data buffers 64A–64E separate from the router 40, these buffers may be implemented within the router 40. Furthermore, the buffers may be centralized in the router 40, if desired. While the present embodiment employs ECC checking, other embodiments may not employ error checking, if desired. While the memory controller 16A is illustrated in the present embodiment as part of a packet-based communication system, it is contemplated that any form of communication between the memory controller 16A and the router 40 may be used.

Turning now to FIG. 5–8, an exemplary request queue entry (FIG. 5) and flowcharts illustrating operation of the control circuit 74 based on the exemplary request queue entry (FIGS. 6–8) are shown. Other embodiments are possible and contemplated. The illustrated request queue entry includes state for supporting coherency as described above as well as the partial write request handled by returning a read response to the router 40 or routing back to the memory controller 16A.

FIG. 5 is a block diagram of one embodiment of an exemplary request queue entry 90. Other embodiments are possible and contemplated. In the illustrated embodiment, the request queue entry 90 may include a valid bit (V), an address field (Address), a source node field (SrcNode), a source unit field (SrcUnit), an source tag field (SrcTag), a type field (Type), a write data buffer pointer (WDB Ptr), a probes initiated bit (PI), a read response bit (RR), a response count field (RC), a probe data bit (PD), and a target done bit (TD).

The V bit indicates whether or not the entry is valid. In some embodiments, the V bit may not be needed. For example, if a shifting request queue is used, the valid entries may be determined from the pointer used to indicate the next entry to be written in the queue.

The address field stores the address of the request. The SrcNode, SrcUnit, and SrcTag fields store the source node number, the source unit number, and the source tag of the request. The source node, source unit, and source tag are compared to corresponding information from the read responses and probe responses supplied to the memory controller 16A, to identify which of the requests in the request queue 50 the response corresponds to.

The Type field stores the type of request. The type may indicate at least read or write. In some embodiments, in which different types of read requests are used to establish different coherency states in the requester, the type may indicate which of the types of read requests were transmitted as well. Similarly, the type may indicate block write versus partial write, in some embodiments.

The WDB Ptr field stores the pointer to the write data buffer entry allocated to the request, if the request is a write. The PI bit indicates whether or not probes have been initiated for the request. The bit may indicate that probes have not been initiated when clear, and the probes have been initiated when set. Other embodiments may reverse the meaning of the set and clear states.

The RR bit indicates whether or not the read response has been received for the read portion of the read-modify-write operation. The bit may indicate, when clear, that the read response has not been received and may indicate, when set, that the read response has been received. Other embodiments may reverse the meaning of the set and clear states. The RR bit may be used as one of the indications that a partial write request is complete, to allow the control circuit 74 to delete the request from the entry.

The RC field stores the probe response count. The RC field may be initialized to the number of probe responses to be received, and may be decremented as probe responses are received. Alternatively, the RC field may be initialized to zero and incremented as probe responses are received.

The PD bit may indicate whether or not a probe response which includes data (e.g. a read response packet with the Prb bit indicating probe) has been received. The bit may indicate, when clear, that the probe response with data has not been received and may indicate, when set, that the probe response with data has been received. Other embodiments may reverse the meaning of the set and clear states.

The TD bit may indicate whether or not a target done response has been transmitted for the request. The bit may indicate, when clear, that the target done response has not been transmitted and may indicate, when set, that the target done response has been transmitted. Other embodiments may reverse the meaning of the set and clear states. The TD bit may be another indicator that the partial write request is complete, to allow the control circuit 74 to delete the request from the entry.

Figure 6:
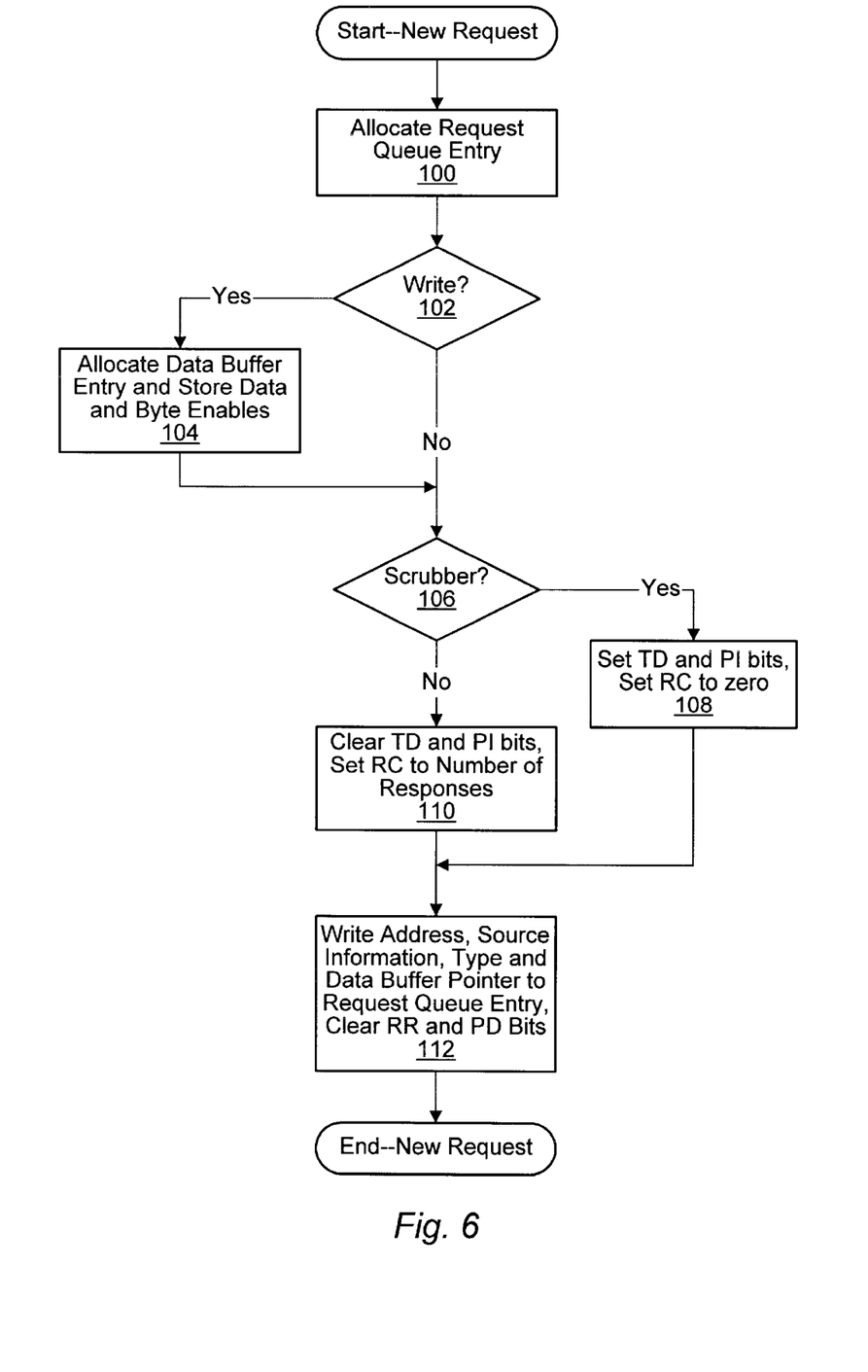
FIG. 6 is a flowchart illustrating operation of one embodiment of the memory controller for receiving a new request.

Turning now to FIG. 6, a flowchart is shown illustrating operation of one embodiment of the control circuit 74 in response to receiving a new request from the router 40. Other embodiments are possible and contemplated. While the blocks are shown in a particular order for ease of understanding, other orders may be used. Furthermore, the blocks shown illustrate the operation of combinatorial logic in the control circuit 74, and thus blocks may be performed in parallel.

In response to the request, the control circuit 74 allocates a request queue entry for the request (block 100). If the request is a write (decision block 102), the control circuit 74 allocates a write data buffer entry/byte enable buffer entry and stores the data and byte enables in the allocated entry (block 104). If the request is sourced by the scrubber (decision block 106), the control circuit 74 may set the TD and PI bits, and set the RC count to zero (block 108). By setting the PI and TD bits, probes will not be transmitted and a target done response will not be transmitted for the scrubber request. Also, setting the RC count to zero indicates that all the probe responses have been received. Accordingly, the scrubber request will perform the read-modify-write sequence (with the byte enables all zero) but not transmit any probes or a target done response. On the other hand, if the request is not a scrubber request, the control circuit 74 clears the TD and PI bits and sets the RC count to the number of responses to be received (block 110). Thus, coherency activity and the target done response may occur for the request.

The control circuit 74 writes the address, source information (source node, source unit, and source tag), type, and write data buffer pointer to the allocated request queue entry (block 112). Additionally, the control circuit 74 clears the RR and PD bits.

Figure 7:
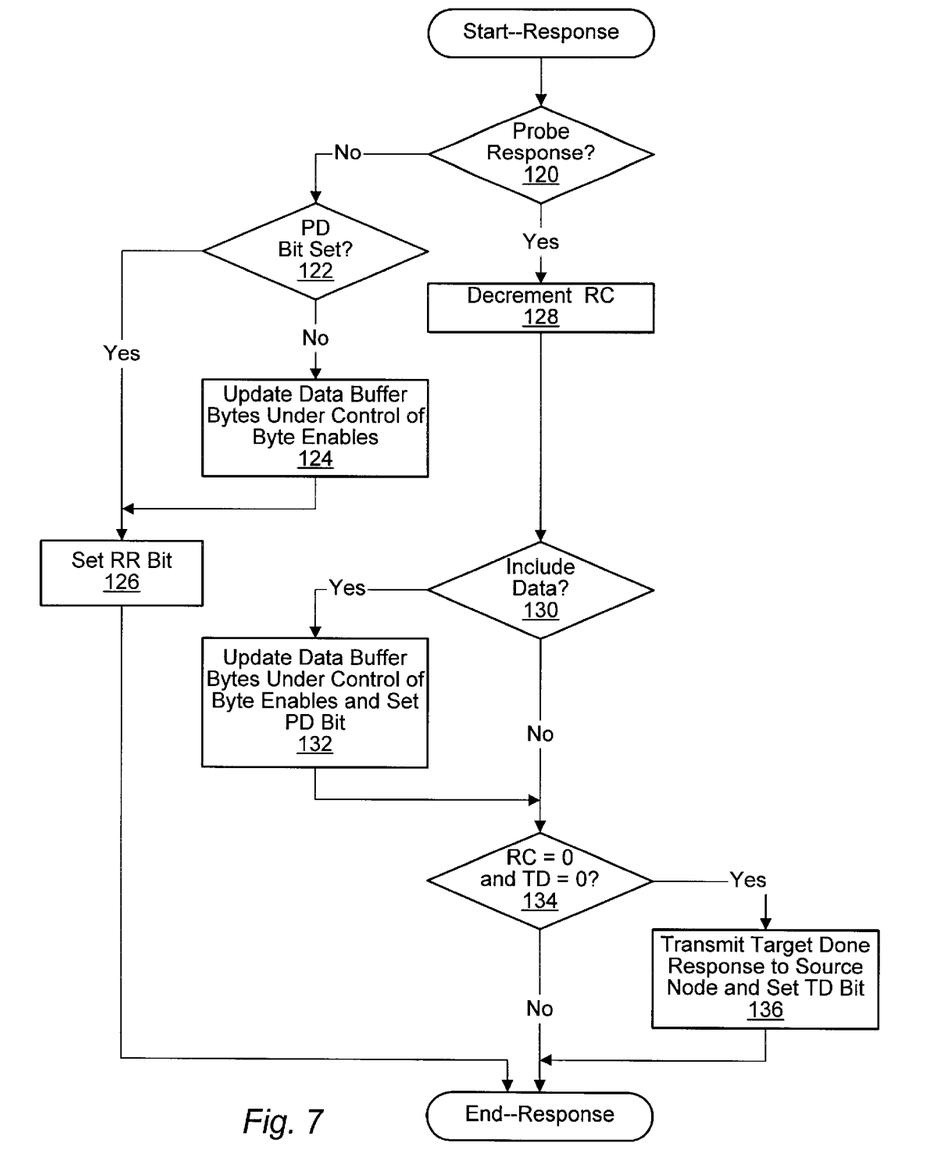
FIG. 7 is a flowchart illustrating operation of one embodiment of the memory controller for receiving a response.

Turning now to FIG. 7, a flowchart is shown illustrating operation of one embodiment of the control circuit 74 in response to receiving a response from the router 40. Other embodiments are possible and contemplated. While the blocks are shown in a articular order for ease of understanding, other orders may be used. Furthermore, the blocks shown illustrate the operation of combinatorial logic in the control circuit 74, and thus blocks may be performed in parallel. Not shown in FIG. 7 is the determination of which request queue entry the response corresponds to. As mentioned above, the control circuit 74 may compare the source node, source unit, and source tag from the response to the corresponding values in the request to locate the correct entry. References to the values stored in an entry in the discussion below refer to the entry identified by the source information in the response.

If the response is not a probe response (decision block 120), the response is a read response for the read portion of the read-modify-write of the partial write request. If the PD bit is clear (indicating that a probe response with data has not been received) (decision block 122), the control circuit 74 updates the write data buffer entry corresponding to the request with the data under the control of the byte enables (block 124). If the PD bit is set (indicating that the probe response with data has been received), the control circuit 74 does not update the write data buffer to preserve the probe response data. In either case, the control circuit 74 may set the RR bit to indicate that the read response has been received (block 126).

If the response is a probe response (decision block 120), the control circuit 74 may decrement the RC count (block 128). If the probe response includes data (e.g. it is a read response packet with the Prb bit set, in the embodiment of FIGS. 1 and 2) (decision block 130), the control circuit 74 may update the write data buffer entry under control of the byte enables and may set the PD bit (block 132). Since the probe response data is more recent than the data read from the memory 14A, the update is performed regardless of whether the data read from the memory has been stored in the write data buffer (as indicated by the RR bit).

If the RC count is zero (all probe responses received) and the TD bit is clear (decision block 134), the control circuit 74 may transmit the target done response to the source node (by storing the target done response in the control buffer 62E) and may set the TD bit (block 136).

Figure 8:
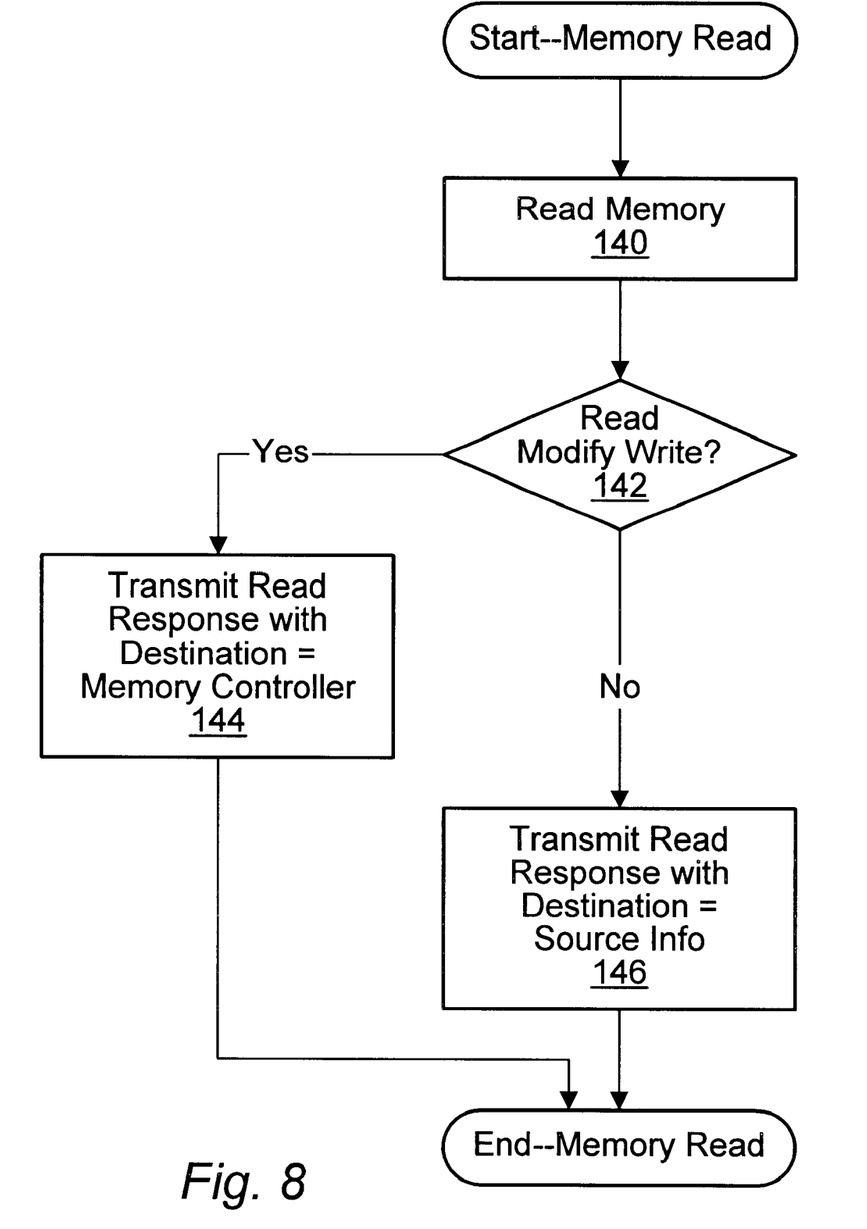
FIG. 8 is a flowchart illustrating operation of one embodiment of the memory controller for performing a RAM read and transmitting the data as a response.

Turning now to FIG. 8, a flowchart is shown illustrating operation of one embodiment of the control circuit 74 for performing a read of the memory 14A. Other embodiments are possible and contemplated. While the blocks are shown in a particular order for ease of understanding, other orders may be used. Furthermore, the blocks shown illustrate the operation of combinatorial logic in the control circuit 74, and thus blocks may be performed in parallel.

The control circuit 74 reads the memory using the address from the request queue entry (block 140). If the read is performed due to a read-modify-write for a partial write request (decision block 142), the control circuit 74 may set the destination of the read response to indicate the memory controller (block 144). For example, the destination node number may be the node number of the node including the memory controller and the destination unit may be the unit number identifying the memory controller. If the read is performed for other reasons (e.g. a read request), the control circuit 74 may set the destination of the read response to equal the source information from the request queue entry (e.g. the source node and source unit from the request queue entry may be used as the destination node and destination unit) (block 146).

Numerous variations and modifications will become apparent to those skilled in the art once the above disclosure is fully appreciated. It is intended that the following claims be interpreted to embrace all such variations and modifications.

What is claimed is:

1. An apparatus comprising:
a router configured to route a write request and write data to a memory controller; and
the memory controller coupled to receive the write request and the write data, wherein, if the write data is a number of bytes less than a minimum number of bytes writeable to a memory to which the memory controller is capable of being coupled, the memory controller is configured to read first data from the memory, the first data comprising the minimum number of bytes and including bytes to be updated with the write data; and
wherein the memory controller is configured to return the first data to the router as a read response; and
wherein the router is configured to return the read response including the first data to the memory controller, wherein the memory controller is configured to merge the first data and the write data in response to receiving the read response from the router.

2. The apparatus as recited in claim 1 wherein the router is configured to return the first data to the memory controller using a same communication path that is used to transmit the write data.

3. The apparatus as recited in claim 2 wherein the memory controller comprises a data buffer coupled to the communication path, wherein the data buffer is configured to store the write data received on the communication path, and wherein the data buffer is configured to merge the first data into the data buffer, the first data also received on the communication path.

4. The apparatus as recited in claim 3 wherein the memory controller is configured to write the merged data in the data buffer to memory.

5. The apparatus as recited in claim 1 wherein the memory controller comprises an error correction code (ECC) check and correction circuit coupled to receive the first data from the memory and configured to check the first data for an ECC error and to correct the ECC error, if detected, in the first data prior to receipt of the first data by the router.

6. The apparatus as recited in claim 5 wherein the router comprises a scrubber, and wherein the scrubber is the source of the write request, and wherein the number of bytes of write data is zero, whereby the first data, with the ECC error corrected if detected, is written back to the memory.

7. The apparatus as recited in claim 6 wherein the memory controller, responsive to the scrubber being the source of the write request, is configured to inhibit initiating probes for the write request.

8. The apparatus as recited in claim 6 wherein the memory controller, responsive to the scrubber being the source of the write request, is configured to inhibit transmitting a done response for the write request.

9. The apparatus as recited in claim 6 wherein the ECC check and correction circuit is configured to signal the scrubber in response to detecting the ECC error during a read request targeting the first data, and wherein the scrubber is configured to generate the write request, having a same address as the read request, in response to the signaling by the ECC check and correction circuit.

10. The apparatus as recited in claim 1 wherein the read response includes a destination identifier used by the router to route the read response.

11. The apparatus as recited in claim 10 wherein, if the read response is for a read generated in response to the write request, the memory controller is configured to set the destination identifier to identify the memory controller.

12. The apparatus as recited in claim 11 wherein, if the read response is for a read request, the memory controller is configured to set the destination identifier to identify a source of the read request.

13. A memory controller comprising:
a request queue coupled to receive a write request;
a data buffer coupled to receive write data corresponding to the write request; and
a control circuit coupled to the request queue and the data buffer, wherein the control circuit is configured, if the write data is a number of bytes less than a minimum number of bytes writeable to a memory to which the memory controller is capable of being coupled, to read first data from the memory, the first data comprising the minimum number of bytes and including bytes to be updated with the write data, and to transmit the first data as a read response; and
wherein the read response is returned to the memory controller, and wherein the data buffer is coupled to receive the first data returned to the memory controller in the read response, and wherein the control circuit is configured to merge the first data and the write data in the data buffer.

14. The memory controller as recited in claim 13 wherein the data buffer is coupled to receive the first data via a same communication path on which the write data is received.

15. The memory controller as recited in claim 14 further comprising an error correction code (ECC) check and correction circuit coupled to receive the first data from the memory and configured to check the first data for an ECC error and to correct the ECC error, if detected, in the first data prior to transmission of the read response including the first data.

16. The memory controller as recited in claim 13 wherein the read response includes a destination identifier used to route the read response, and wherein, if the read response is for a read generated in response to the write request, the control circuit is configured to set the destination identifier to identify the memory controller.

17. A method comprising:
receiving a write request and write data in a memory controller;
if the write data is a number of bytes less than a minimum number of bytes writeable to a memory to which the memory controller is capable of being coupled, reading first data from the memory, the first data comprising the minimum number of bytes and including bytes to be updated with the write data; and
transmitting the first data from the memory controller as a read response, wherein the read response including the first data is subsequently returned to the memory controller;
receiving the read response including the first data in the memory controller; and merging the first data with the write data responsive to receiving the read response in the memory controller.

18. The method as recited in claim 17 wherein receiving the write data occurs via a same communication path as receiving the first data.

19. The method as recited in claim 17 further comprising:
writing the merged data to memory.

20. The method as recited in claim 17 further comprising:
checking the first data for an ECC error prior to transmitting the first data; and
correcting the ECC error, if detected, prior to transmitting the first data.

21. The method as recited in claim 17 wherein the read response includes a destination identifier used to route the read response, the method further comprising:

if the read response is for a read generated in response to the write request, setting the destination identifier to identify the memory controller; and if the read response is for a read request, setting the destination identifier to identify a source of the read request.

* * * * *